March 6, 1928. 1,661,759
F. R. KING
PIPE CLEANER
Original Filed April 18, 1925
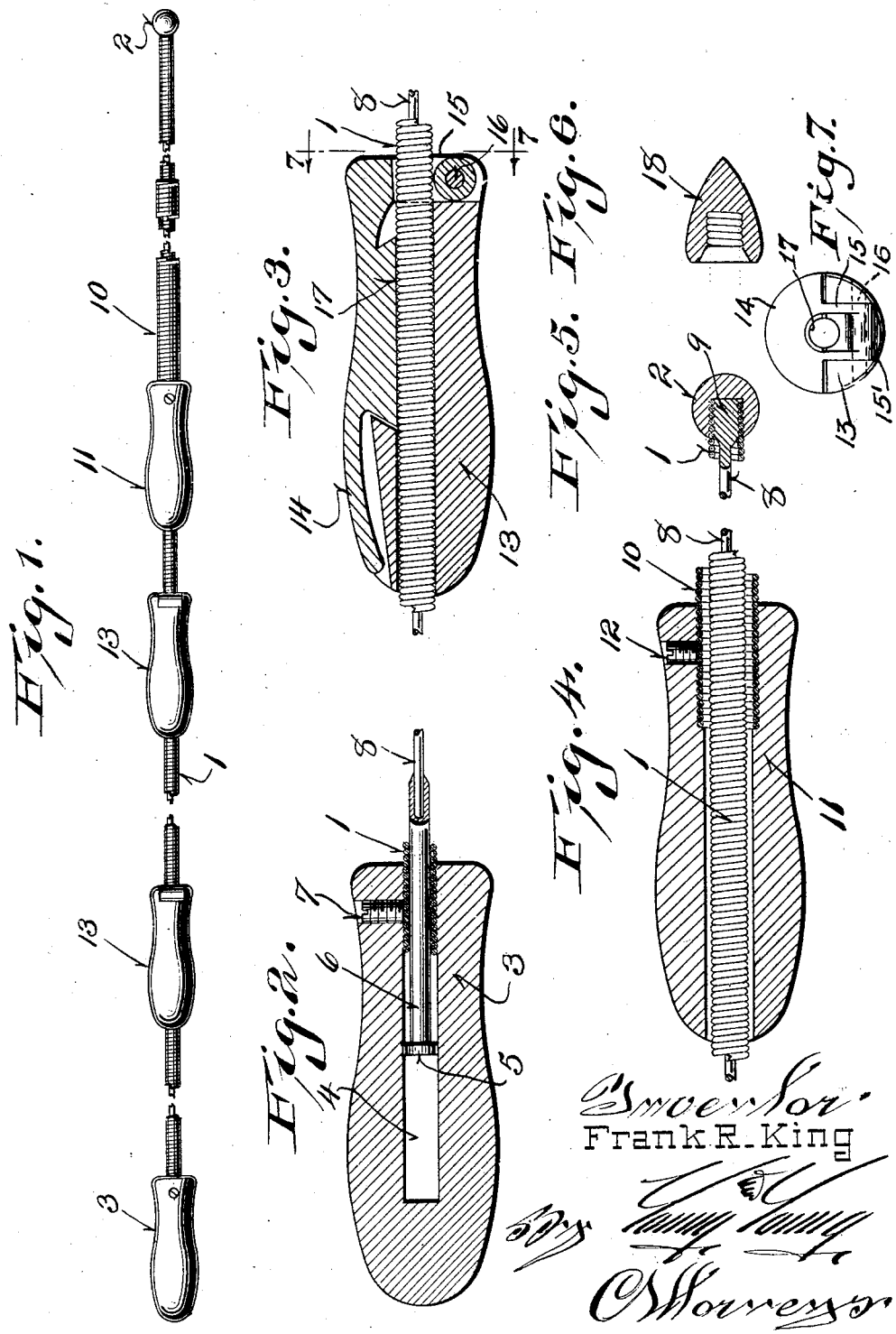
Inventor
Frank R. King Patented Mar. 6, 1928.

1,661,759

UNITED STATES PATENT OFFICE.

FRANK R. KING, OF MADISON, WISCONSIN.

PIPE CLEANER.

Application filed April 18, 1925, Serial No. 24,153. Renewed January 3, 1928.

This invention relates to pipe cleaners.

Objects of this invention are to provide a pipe cleaner which will follow a tortuous path with ease, and without danger of getting caught either during forward motion or during retracting motion and that is so constructed that a telescopic action of the parts are secured to thus permit the cleaner to be inserted a great distance into the pipe.

Further objects are to provide a cleaner which, although flexible and resilient throughout its major portion is, nevertheless, so constructed that when it is retracted, stretching of the resilient portions cannot occur as they are prevented from being elongated beyond a predetermined amount.

Further objects are to provide a pipe cleaner which is freely flexible, and which is so constructed that a plurality of friction grips of clutch-like construction are employed to permit rotary or translatory motion to be imparted with the greatest ease and without permitting intermittent backward slipping of the pipe cleaner during these operations.

An embodiment of the invention is shown in the accompanying drawings, in which:—

Figure 1 is a view with parts broken away showing the cleaner.

Figure 2 is an enlarged sectional view of the rear end of the cleaner.

Figure 3 is an enlarged sectional view through one of the end grips or clutch members.

Figure 4 is a sectional view to an enlarged scale through an intermediate end member.

Figures 5 and 6 are views of different forms of heads.

Figure 7 is a view taken on the line 7—7 of Figure 3 and is an end elevation of the structure shown in Figure 3 with the sleeve and associated parts omitted.

Referring to the drawings, it will be seen that the pipe cleaner consists of an elongated, tightly twisted helix 1 of spring wire with the convolutions arranged in contact with each other from one end of the helix to the other. The other end of the helix carries an exploring ball 2 which is rigidly secured thereto as hereinafter described. The rear end of the elongated member 1 is received within and secured to an end member 3. As shown in Figure 2, this end member 3 is provided with a hollow portion 4 within which the enlarged end 5 of a sleeve 6 is adapted to slide.

It is to be noted from this figure that the main flexible sheath or sleeve 1 is secured by means of a set screw 7 to the member 3. The member 6 is rigidly secured to a flexible wire cable 8 which extends from one end of the device to the other. Its forward end is rigidly secured within the head 2, as shown in Figure 5. This securing at the forward end may be readily effected by providing the cable 8 with an enlargement 9 which is externally threaded to conform to the convolutions of the sheath or flexible tubular member 1. The ball 2 is internally threaded and is adapted to be screwed in place upon the convolutions of the member 1 to thus lock such convolutions between the enlargement 9 of the cable 8 and the ball 2.

Referring again to Figure 1, it will be noted that a second sheath or helix 10 is slidably mounted upon the main helix or sheath 1. This member 10 is secured within an intermediate handle 11, as shown particularly in Figures 1 and 4, and is locked in place by means of a set screw 12. The handle 11 is provided with an aperture therethrough which permits free sliding of the member 1.

A pair of hand grips or clutch members 13 are provided and are slidably mounted upon the member 1, as shown in Figures 1 and 3. These members are identical in construction and one only need be described. The member 13 consists of a handle-like body portion which is apertured throughout its length and slidably receives the helix 1. It is provided with a portion 14 which is pivotally secured to the body part 13. This portion 14 may conveniently be provided with a pair of arms 15, which span the member 1, as shown in Figure 3, and which are pivoted by means of the pin 16 to the body portion. The member 14 is provided with an enlarged central portion or shoe 17 which grips the member when the operator tightens his grip around this clutch-like hand grip. It is to be noted that the arms 15 are joined at their lower ends by the member or portion 15′, as shown in Figure 7, such portion acting as a brace or spacer for the arms.

It is to be understood that the head 2 is detachable and that other forms of head may replace this one. For example, the pear-shaped head 18, as shown in Figure 6, may be screwed upon the end of the flexible tubular member 1.

In using the device, the outer sheath 10 is pushed forwardly until it contacts with the head 2. Thereafter, the entire device is inserted into the pipe as far as it will go by suitably manipulating the handle 11 on the sheath 10. When this member 10 is arrested and further motion prevented, the inner tubular member 1 is slid through the member 10 and projects the ball 2 forwardly from the tubular member 10, such outer member acting merely as a guide for the sliding inner member 1. The clutch members 13 are adapted to be gripped in the hands of the operator and to be alternately used. For example, the operator may give a twisting and forward motion by tightly gripping one of the clutch members 13, and twisting it while pressing it forwardly. Thereafter, he tightens his grip upon the other clutch member or hand grip and loosens his grip upon the first clutch member or hand grip and repeats the motion with the second hand grip. This cycle of operations is continued until the desired cleaning of the pipe has been effected. It is to be noted that by providing two clutch members undesirable unwinding or backward slipping of the device is prevented.

Also, it is to be noted that when the device is retracted, the non-extensible cable 8 prevents undesirable elongation of the flexible members as it is secured at its ends to the rear handle 13 and the ball 2. The sliding motion of the head 5 (see Figure 2) with reference to the handle 3, is not sufficient to permit undesirable extension of the helical member 1.

The relative sliding motion of the head 5 and the handle 3 is provided to permit ready coiling of the device without danger of snapping the cable 8. Obviously, when the device is coiled as, for instance, when it is stored in a suit case, the cable 8 has motion relatively to the member 1 and consequently this motion has to be provided for as otherwise excessive stresses would be imposed upon the cable.

Although the invention has been described in considerable detail, it is to be understood that the invention may be variously embodied and is, therefore, to be limited only as claimed.

I claim:
1. A pipe cleaner comprising an elongated flexible main member, a cable positioned within said elongated member and adapted to limit the extension of such member, a second elongated member of tubular formation mounted upon said first mentioned elongated member, a handle secured to the rear end of said second elongated member, and a frictional clutch hand grip mounted upon said first elongated member rearwardly of said second elongated member.

2. A pipe cleaner comprising an elongated flexible tubular member having an exploring head at one end, and a handle at the other end, a cable positioned within said member and secured at its outer end to said head and having a limited motion within said handle, a second tubular member slidably mounted upon said first tubular member, a handle rigidly secured to the rear end of said second tubular member, a hand grip slidably mounted upon said first tubular member, said hand grip comprising a body portion through which said first mentioned tubular member may slide and having a shoe adapted to be pressed against said tubular member and movably carried by the body portion of said hand grip.

3. A pipe cleaner comprising an elongated main tubular member formed of a helix of spring wire, an exploring head rigidly attached to the outer end of said member, a handle rigidly attached to the rear end of said member, a cable rigidly attached at its outer end to said exploring head and having limited motion at its inner end with reference to said handle, a second tubular member formed of a helix of spring wire and surrounding said first mentioned tubular member and slidable thereon, said second tubular member having a handle secured to its rear end, and a pair of hand grip clutch members mounted upon said first mentioned tubular member rearwardly of said second mentioned tubular member.

In testimony that I claim the foregoing I have hereunto set my hand at Milwaukee, in the county of Milwaukee and State of Wisconsin.

FRANK R. KING.